UNITED STATES PATENT OFFICE.

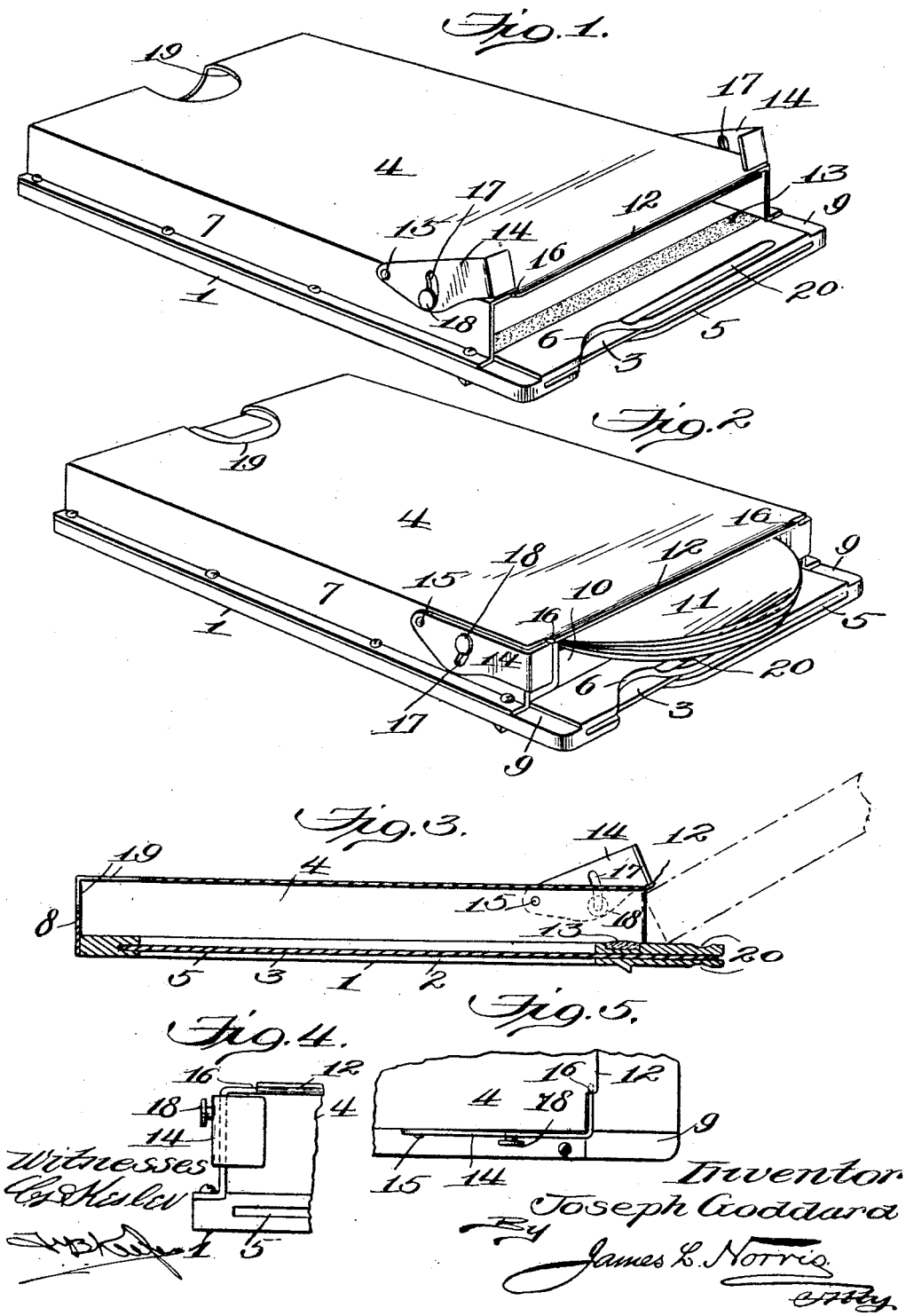

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

FILM-PACK ADAPTER.

968,341.  Specification of Letters Patent.  Patented Aug. 23, 1910.

Application filed June 16, 1909. Serial No. 502,615.

*To all whom it may concern:*

Be it known that I, JOSEPH GODDARD, a citizen of the United States, residing at Rochester, in the county of Monroe and State of New York, have invented new and useful Improvements in Film-Pack Adapters, of which the following is a specification.

The present invention relates to improvements in film pack adapters whereby a package of films may be readily and properly placed within a camera for exposure, and it has for its object primarily to provide a simple and improved device of this class which is capable of readily receiving a package of films and after receiving the films, it effectually prevents leakage of light thereto, except through the exposure opening and during the exposure of each film of the package, simple and improved devices being provided for preventing the film package from being pulled from the adapter or holder during the operation of bringing the different films into exposure position by manipulation of the tabs which tabs are exposed at the exterior of the holder for such purpose although such package-retaining devices may be readily set in an inoperative position while a package of films is being inserted or removed with reference to the holder.

Another object of the invention is to provide an improved shutter or exposure controlling slide either end of which may be inserted into the slot provided for it in the front of the holder, appropriate notches or recesses being provided whereby the outer end of the slide may be gripped by the fingers to permit its removal.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a perspective view of a film pack adapter constructed in accordance with the present invention, the package-retaining devices being shown in an inoperative position so as to permit the insertion or removal of the package; Fig. 2 is a view similar to Fig. 1 showing a package of films within the adapter, the catches or retaining devices being shown in position to prevent removal of the package from the adapter owing to the tension applied to the tabs; Fig. 3 represents a longitudinal section of the adapter indicating diagrammatically the manner in which the package of films may be introduced therein; and Figs. 4 and 5 are detail views of one of the catches for retaining the film within the adapter.

Similar parts are designated by the same reference characters in the several views.

In the accompanying drawing, I have shown one embodiment of the invention as an example, it consisting in the present instance of a front section 1 containing the exposure opening 2 and the exposure controlling slide or shutter 3, and a rear or package-containing section 4. The front section 1 is preferably substantially flat and may be conveniently formed of thin wood, it having a slot 5 to receive the exposure controlling slide 3, and one end of the front section projects beyond the rear section 4 and is provided with a notch or cut-away portion 6. The exposure controlling slide 3 in the present instance is reversible, that is to say, either end may be inserted into the slot provided for its reception. For this purpose, both ends of the slide are alike, that is to say, they may be beveled and both ends of the slide are free from projections so that the slide may wholly enter the slot. The length of the slide is such that when its inner end reaches the bottom of the slot 5, a portion of the outer end of the slide rests in the cut-away portion or notch 6, and that portion of the slide thus exposed may be readily gripped by the fingers to effect its withdrawal.

The rear section 4 of the adapter is preferably composed of sheet metal, aluminum being suitable, its back being preferably flat or smooth as shown, while its lateral and rear edges are turned forwardly to form flanges 7 and 8 respectively, the edges of the flanges 7 being outturned and are secured by suitable devices to the rear side of the front section 1, while the flange 8 at the rear of the adapter may be directly attached to the rear edge of the front section, as shown in Fig. 3. In the present instance, the rear face of the front section is provided adjacent to its lateral edges with longitudinally extending rabbets 9 in which the edges of the flanges 7 are seated. The rear section is of such dimensions as to receive and contain a film pack, these packs being of certain standard sizes and are obtainable in the open market. The film package is inserted and removed through an aperture which is left in one end of the rear section 4 of the adapter, Fig. 4 showing the film package 10 in position with the film-manipulating tabs 11 of the package projecting through the said aperture. In order to facilitate the introduction of the package through the single aperture at the end of the adapter, the edge 12 of the rear section is preferably deflected or rounded outwardly as shown in Fig. 3, and the depth of the chamber provided for the package is such that the package will snugly fit within it, although the package may be readily slid longitudinally of the adapter during its insertion and removal. In order to effectually seal the space between the outer end of the film package adjacent to its insertion aperture and the front section of the adapter, a light-excluding strip 13 of felt or other appropriate material is preferably inserted in the rear face of the front section 1 adjacent to the aperture through which the film package is inserted.

The tabs 11 it is well known are employed for the purpose of bringing the films successively into exposing position, the transfer being effected by a pulling of each tab. In order to prevent the package from being accidentally pulled from the adapter owing to the tension thus exerted on the tabs, I provide devices on the adapter which coöperate with those portions of the film package which are exposed at the insertion aperture of the adapter. In the present instance, I have shown a pair of latches 14 which are pivoted at 15 to the outer sides of the side flanges 7 of the adapter, the free ends of the latches being arranged toward the aperture through which the film package is inserted and removed, and such ends of the latches are bent inwardly or toward one another so as to partially overlie the said aperture and thus engage the exposed ends of the film package when the same are in position within the adapter. In the present instance, I have provided latches which are automatically retained either in operative or inoperative position, the outwardly rounded edge or lip 12 in the present instance being interrupted at points adjacent to the lateral flanges 7 so as to form shoulders 16. The latches 14 are composed of resilient material whereby they may be deflected laterally of the plane of pivotal movement and, in order to limit such lateral movement, each latch is provided with a segmental slot 17 with which a headed projection 18 on the flange 7 coöperates. Each shoulder 16 is arranged to coöperate with its respective latch to retain the same either in an operative or inoperative position, the latch being sprung laterally so as to disengage its inturned end from this shoulder when it is desirable to shift the position of the latch, the resilience of the latch serving, however, to retain it in coöperative relation with the shoulder 16 while the headed projection 18 serves the dual function of limiting the lateral deflection of the latch in unfastening it and the pivotal movement thereof whereby the latch will be positioned properly whether in an operative or an inoperative position.

When the film package is properly positioned within the adapter, the film-manipulating tabs are the only parts exposed. In order to facilitate the removal of the film package, however, the rear corner of the section 4 is preferably provided with an opening 19 to receive the thumb or finger whereby suitable pressure may be applied to the rear end of the film package to remove it from the adapter sufficiently to enable its forward end to be gripped to complete the removal.

A film pack adapter constructed in accordance with the present invention is very simple in its construction and is composed of few parts which may be readily manipulated, especially as there is a single opening through which the film pack is inserted and removed and through which the film-manipulating tabs project, and the back of the adapter is permanently closed so that there can be no leakage of light to the films of the pack while the same are contained within the adapter.

In order to facilitate the removal of the film pack from the camera, one or more grooves may be formed on the outer projecting end of the front section 1, a pair of such grooves or channels 20 being shown in the present instance which are arranged at the front and rear sides of such projecting end.

I claim as my invention:—

1. A holder to contain a package of films having a front section provided with an exposure opening, and a rear section permanently attached to the front section, one edge of the rear section provided with an aperture, the rear section of the holder forming a chamber which is of the same size in cross section as that of said aperture whereby a package of films may be introduced edgewise into the holder through said aperture and the tabs of the package may project through said aperture.

2. A holder to contain a package of films having a front section provided with an exposure opening and a rear section permanently attached to the front section, one edge of the rear section provided with an aperture to permit the insertion edgewise of a flat package of films and forming a passage for the manipulating tabs thereof, and latches carried by the holder and capable of moving transversely of said aperture and adapted to coöperate with a package of films to retain the same in the holder and permitting withdrawal of said tabs while the package is retained within the holder.

3. A film pack adapter comprising a holder constructed to fit into a camera and having an exposure opening in its front and provided with a permanently closed back forming a receptacle to contain a package of films, an aperture being formed at one end of the closed back of a size and shape to permit a package of films to be inserted and removed therethrough and through which aperture the film-adjusting tabs project, and means on the adapter to coöperate with the package of films to prevent pulling of the package from the holder during the manipulation of the tabs thereof.

4. A film pack adapter comprising a front section provided with an exposure opening and an exposure-controlling slide fitted therein, and a back attached to the front section, said back being closed at three of its edges and having an aperture in one edge of a size and shape to slidingly receive a package of films so as to permit the tabs thereof to project through said aperture, that edge of the back opposite to the aperture being provided with a finger-receiving opening, and devices on the adapter adjustable to engage that portion of the film package exposed by said aperture to retain the package of films within the holder while the tabs thereof are being adjusted.

5. A film pack adapter comprising a flat front section provided with an exposure opening and a reversible exposure controlling slide, both ends of which are straight throughout their width and are capable of entering said front section and of forming a light-tight closure for said opening, a portion of the front section being cut away or notched to permit the outer edge of the exposure controlling slide to be gripped by the fingers, a back section attached to the front section and having an aperture in one edge of a size and shape to admit a package of films edgewise and to form a passage for the film adjusting tabs, the aperture in the back being parallel to but located inwardly from the notched portion of the front section.

6. A holder to contain a package of films having an aperture in one edge of a size and shape to admit a package of films edgewise and forming a passage for the film manipulating tabs which are adapted to project therethrough to the exterior of the holder, and means on the holder to engage the package of films while within the holder to prevent the pulling of said package through said aperture during the manipulation of the tabs thereof, said means being arranged to engage the package at points outwardly beyond the tabs to avoid interfering with the withdrawal of said tabs.

In testimony whereof I have hereunto set my hand in presence of two subscribing witnesses.

JOSEPH GODDARD.

Witnesses:
  W. C. SEWARD,
  J. A. DYER.